Patented Nov. 7, 1950

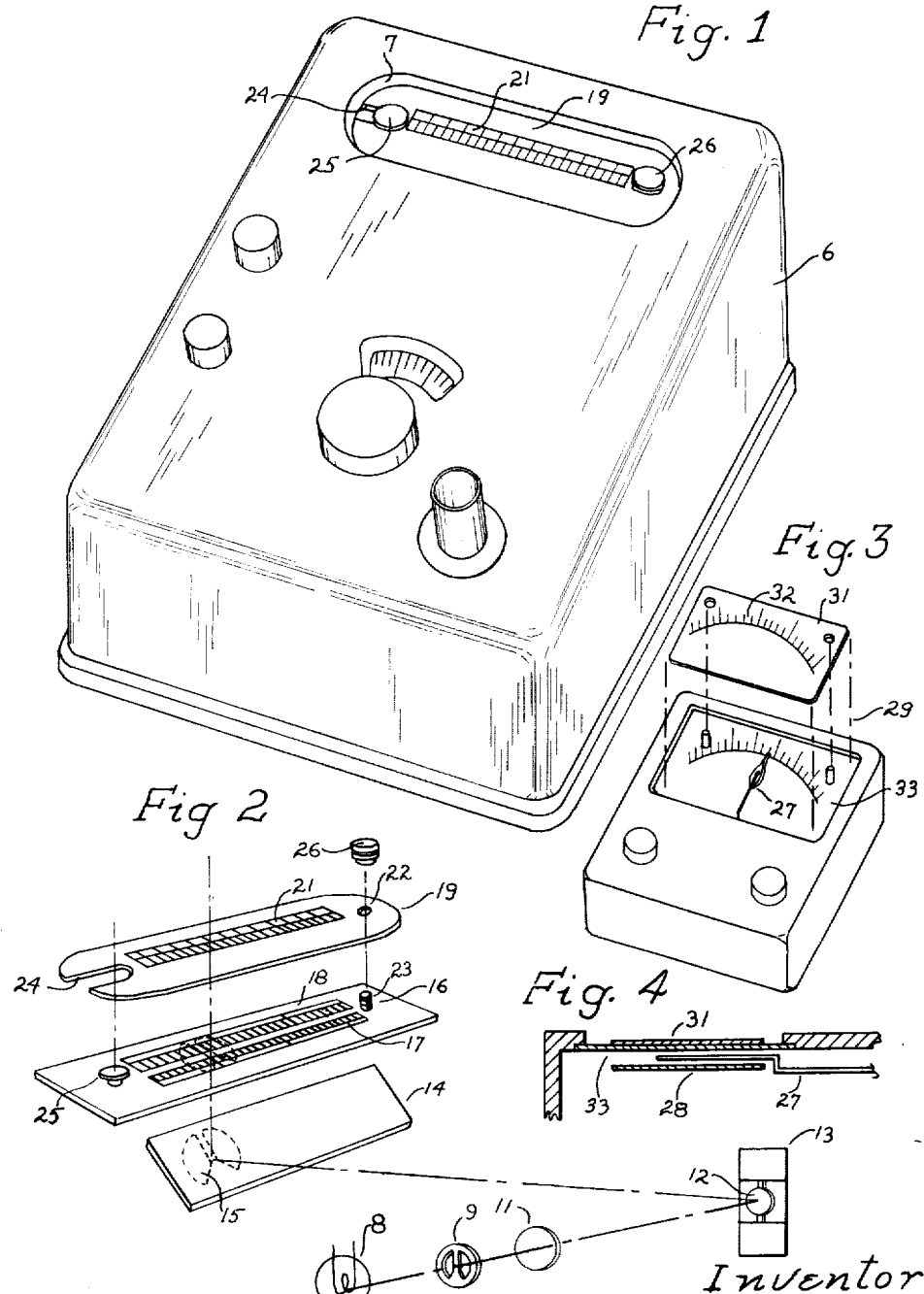

2,528,640

UNITED STATES PATENT OFFICE 2,528,640

CHANGEABLE GRADUATED SCALE

Edwin D. Coleman, Maywood, Ill.

Application September 24, 1945, Serial No. 618,133

7 Claims. (Cl. 116—114)

This invention pertains to graduated scales for use on measuring instruments of various types, such, for instance, as galvanometers, turbidity testers, spectrophotometers, and the like.

Instruments of this character are customarily equipped with a graduated indicating scale provided with standard calibrations. For particular purposes it is frequently desirable to employ a scale having non-standard or special calibrations. Furthermore, in some instances it may be desirable that the scale be calibrated in a plurality of units or rows of graduations. In either instance, for laboratory work the user may prefer his own system of graduations to that of a standard or special system of graduations with which the instrument is equipped.

The primary purpose of my invention is the provision of a construction by means of which the user may interchangeably apply auxiliary scales to an instrument and thereafter read the auxiliary scale without interference from other scales which may at the same time be permanently affixed to the instrument.

A further purpose of my invention is to provide a scale construction which includes an auxiliary scale panel which may be supplied in graduated form by the manufacturer upon which the user may apply his own graduation marks and which can be used when desired without removing the standard scale from the instrument, but, on the contrary, by superimposing a panel over the standard graduated panel, the superimposed panel being adapted to render invisible part or all of the graduations on the standard panel, while presenting for observation instead the graduations arranged in accordance with other calibrations required or desired by the user in each particular instance and located in calibrated relationship with the instrument.

For the purpose indicated my invention contemplates the marking of the graduations on a standard panel in an easily discernible color, and the employment for special purposes of a supplemental panel of the same color as the graduation marks on the standard panel together with means for properly locating the same, so that, when the supplemental panel is superimposed upon the standard panel and light is projected through the panels, the colored graduation marks on the standard panel will be rendered invisible, while the special graduation on the supplemental panel will be readily discernible in their proper calibrated position on the instrument.

For the purpose of facilitating an understanding of my invention, I have illustrated on the accompanying drawing a preferred embodiment thereof, referring to which Fig. 1 is a perspective of an instrument housing equipped with my invention;

Fig. 2 is a schematic exploded view illustrating the principle of operation of the instrument of Fig. 1;

Fig. 3 is a perspective of a modified type of instrument; and

Fig. 4 is an enlarged fragmental sectional view of another modification.

While, as previously stated, the principles of my invention may be embodied in instruments of various characters, it is here shown for illustrative purposes as applied to a spectrophotometer. The structural details of the instrument constituting no part of my invention are not illustrated herein, but in Fig. 1 is shown only the casing 6 of such an instrument to which my improved scale is applied.

Those instruments to which my invention is applicable may be equipped with a source of light between which and the eye of the observer my improved scale is positioned. In the type of instrument disclosed in Fig. 1, the scale indicated generally by reference character 7 is mounted in the top wall of the cabinet near one end thereof. The arrangement of the pertinent elements of the instrument in the interior of the cabinet is illustrated schematically in Fig. 2.

From an inspection of Fig. 2 it will be observed that a source of light, such as a lamp bulb 8 is positioned to project light rays through a perforated object 9 and a lens 11 upon a reflecting mirror 12 carried by the movable coil 13 of a galvanometer. A stationary mirror 14 is positioned to receive from the mirror a reflected image 15 of the object 9, so that a shadow line bounded on each side by a light portion is reflected upwardly onto the panel 16 mounted in an outer wall of the cabinet, the shadow line being the indicator of the instrument.

The panel 16 may, if desired, be entirely blank but as herein shown is provided with two sets of graduations indicated as 17 and 18, respectively, one of which, such as 17, may be calibrated in one standard graduation unit, and the other, 18, will be calibrated in some other standard unit. The panel 16 is translucent, so that the image 15 may be observed and its position longitudinally of the panel determined by the position of the mirror 12 under the influence of the movable galvanometer coil. The standard or conventional graduations 17 are preferably applied to the panel in a black, permanent color, while the special graduation marks 18 are applied as a transparent or translucent ink in some other color such as red for instance.

As previously stated, it is frequently desirable that the special graduations be changed or that another set of graduations arranged in accordance with a different calibration from those of 18 be employed for certain work. To meet these requirements my invention contemplates the provision of a supplemental panel or a plurality of interchangeable panels designated generally by reference character 19, which is adapted to be superimposed upon the panel 16 and may carry a set of graduations 21 calibrated in accordance with the particular requirements to be met in the use of the instrument.

Means are provided for accurately locating the supplemental panel with respect to the standard graduations 17 (or the instrument needle or shadow) and for this purpose the supplemental panel 19 has an opening 22 adapted to fit over the stud 23 projecting upwardly from or through the panel 16 and with a slot 24 adapted to be engaged beneath the headed stud 25 at the other end of the panel 16. By means of these studs an accurate positioning of the supplemental panel 19 upon the panel 16 is insured, whereupon the supplemental panel may be locked in position by a thumb nut 26 threadable upon the stud 23.

The supplemental panel 19 may be made of plastic or any suitable material which is colored so that the body of the panel is the same color as the coloring of the graduations 18 on the panel 16. It will be observed that the graduations 21 on the panel 19 are placed at one side of the longitudinal center thereof, so as to overlie the graduations 18 of the main panel. The effect of the supplemental panel is to obliterate or render invisible the graduations 18 on the main panel, which are of the same color as the supplemental panel, but it does not obscure the standard graduations 17. The main panel 16 may, therefore, remain as a permanent panel upon the instrument carrying the standard graduation scale 17, and the special scale 18 may be replaced in effect by any preferred calibration by simply superimposing a colored supplemental panel carrying the desired calibrated graduations upon the standard panel 16, the scale 21 being printed in black, opaque or in a color contrasting with the panel 19 so as to be easily read.

While a plurality of interchangeable scale panels carrying desired calibrations may be supplied by the manufacturer, these panels may also be supplied unmarked to the user of the instrument, having their upper surface slightly roughened to receive pencil marks or the like, and after such marks have been applied, they may be fixed or rendered permanent by lacquering this roughened surface, which also renders the surface smooth and more nearly transparent than when roughened. This smoothening of the supplemental panel by lacquering thus increases the visibility of the image to be observed through the composite scale comprising the superposed panels.

In the type of instrument disclosed in Figs. 3 and 4 a conventional form of meter is shown having an indicator in the form of an indicating needle 27, instead of a reflected image, arranged to travel over the standard scale 28, which corresponds in function with the permanent panel 16 previously described. In this instance a supplemental panel 31 corresponding to the panel 19 is positioned over the scale 28 on a transparent plate 33. The panel 31 is, of course, colored to correspond with the color of the graduations of the scale 28, as previously described, so that the scale 28 will become invisible and the position of the needle 27 with respect to the scale 32 on the supplemental panel 31 may readily be observed.

In this instance the light, instead of coming from within the instrument case, may come from above, but the effect will be the same. That is, the supplemental panel 31 will conceal or in effect obliterate all markings on the main panel 28 which are printed in a transparent ink having the same color as the body of the supplemental panel 31 if the light comes from below. If the light comes from above, the printing on the panel 28 may of course be opaque.

It will be apparent, therefore, that I have provided a scale which comprises a translucent or opaque panel, depending upon the position of the source of light, which carries a scale of standard graduations applied thereto in black and a scale of specially calibrated graduations applied thereto in a color which is rendered invisible by the supplemental panel of my improved scale which is of the same color as the coloring of the special graduations and is superimposed upon, either contiguously to or in spaced relation to, the main panel. By the provision of a scale and positioning means of this character the user may convert the instrument from standard measurements to special measurements required in any particular instance by simply placing over the standard panel a supplemental colored panel carrying graduations calibrated in accordance with the requirements.

The details of the instrument employed and the size, shape, proportion and spacing of the panels constituting my scale may obviously be varied within considerable limits without departing from the scope of my invention as defined in the following claims.

I claim:

1. A changeable graduated scale for use on measuring instruments or the like, comprising a panel provided with colored graduations, and a readily removable supplemental light transmitting panel of the color of said graduations provided with graduations of a different color and superimposed upon said first panel, whereby said first graduations are rendered invisible and said different colored graduations are presented for observation.

2. A changeable graduated scale for use on measuring instruments or the like, comprising a panel provided with colored graduations, a supplemental light transmitting panel of the color of said graduations provided with graduations of a different color and shaped to be superimposed upon said first panel and cover the graduations thereon, whereby said first graduations are rendered invisible and said different colored graduations are presented for observation and means accessible from the exterior of the instrument for securing the supplemental panel in a preselected calibrated position with respect to the instrument.

3. A changeable graduated scale for use on measuring instruments or the like, comprising a first light transmitting panel provided with colored graduations, and arranged for the passage of light therethrough for indicating purposes, and a removable supplemental light transmitting panel of the color of said graduations provided with graduations of a different color and superimposed upon said first panel, whereby said first graduations are rendered invisible and said different colored graduations are presented for observation, and means for locating the supplemental panel on the first panel in a predetermined calibrated position.

4. In combination a changeable graduated scale for use on measuring instruments or the like, comprising a light transmitting panel provided with colored graduations and a supplemental light transmitting panel of the color of said graduations positioned between said panel and the point of observation and provided with graduations visible from the point of observation, and indicating means movable with respect to the graduations and visible when used with either panel.

5. A changeable graduated scale, comprising a panel provided with a plurality of sets of graduation marks, each set being of a different color, and a removable supplemental light transmitting panel of the same color as one of said sets and carrying a set of graduations marks in a different color, said supplemental panel being adapted to be interposed between said first panel and the point of observation, whereby the graduation marks on the first panel in the same color as the supplemental panel will be rendered invisible and supplanted in effect by the graduations on said supplemental panel.

6. A changeable graduated scale, comprising a panel provided with a plurality of sets of graduation marks, each set being of a different color, and a removable supplemental light transmitting panel of the same color as one of said sets and carrying a set of graduation marks in a different color, said supplemental panel being adapted to be interposed between said first panel and the point of observation, whereby the graduation marks on the first panel in the same color as the supplemental panel will be rendered invisible and means for detachably securing the supplemental panel on the instrument with the scale thereof in preselected position with respect to a preselected position of the indicator of the instrument.

7. A changeable graduated scale for use on measuring instruments, comprising a permanent panel provided with graduation marks, some at least of which are of a prominent color, and a replaceable supplemental panel formed of light transmitting material such as plastic of the same prominent color, said supplemental panel being provided with graduation marks of a different color adapted to supplant for reading purposes the prominent colored marks on the permanent panel rendered invisible by the superimposition of said colored supplemental panel.

EDWIN D. COLEMAN.

REFERENCES CITED

The following references are of record in the file of this patent:

UNITED STATES PATENTS

| Number | Name | Date |
| --- | --- | --- |
| 960,946 | Jones | June 7, 1910 |
| 1,418,495 | Sudler et al. | June 6, 1922 |
| 1,929,668 | Golsborough | Oct. 10, 1933 |
| 2,009,209 | Scantlebury | July 23, 1935 |
| 2,019,882 | West | Nov. 5, 1935 |
| 2,086,697 | Caesar | July 13, 1937 |
| 2,373,168 | Cockerell | Apr. 10, 1945 |

FOREIGN PATENTS

| Number | Country | Date |
| --- | --- | --- |
| 374,340 | Great Britain | June 9, 1932 |